H. LIPPOLD.
VALVE.
APPLICATION FILED APR. 15, 1905.
926,885.
Patented July 6, 1909.
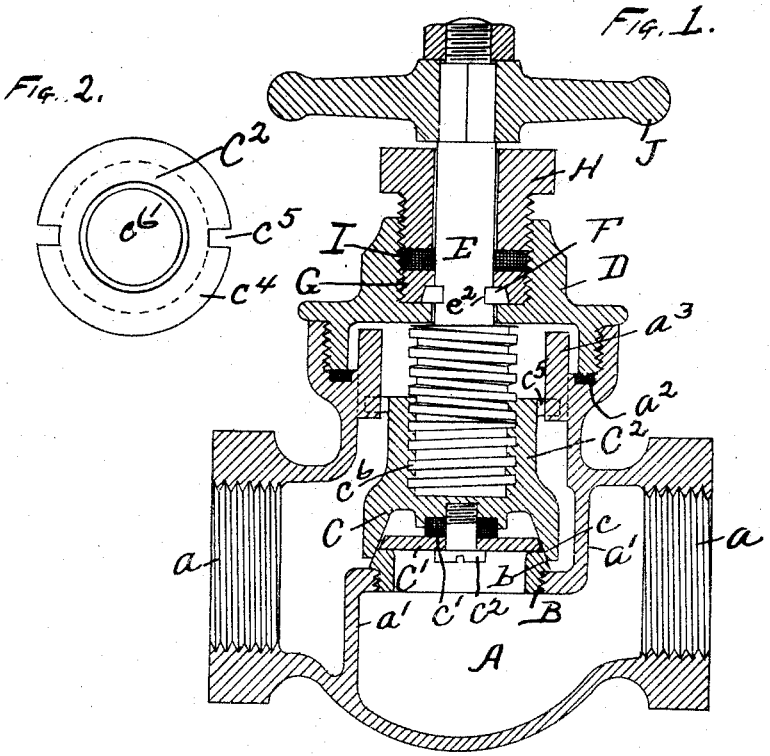
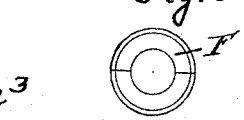

UNITED STATES PATENT OFFICE.

HENRY LIPPOLD, OF ERIE, PENNSYLVANIA.

VALVE.

No. 926,885.  Specification of Letters Patent.  Patented July 6, 1909.

Application filed April 15, 1905. Serial No. 255,808.

*To all whom it may concern:*

Be it known that I, HENRY LIPPOLD, a citizen of the United States, residing at Erie, in the county of Erie and State of Pennsylvania, have invented new and useful Improvements in Valves, of which the following is a specification.

This invention relates to valves and consists in certain improvements in the construction thereof as will be hereinafter fully described and pointed out in the claims.

The invention is illustrated in the accompanying drawings as follows:—

Figure 1 shows a central section through the valve. Fig. 2, a plan view of the valve disk. Fig. 3, a plan view of the split key ring used in the construction of the valve.

A marks the valve chamber which has the usual outlet and inlet $a$ which are separated by the diaphragm $a'$. The valve opening extends through this diaphragm in the usual manner and is provided with the valve seat B. The valve seat has a flat surface on which a valve plate $C'$ seats and a conical surface $b$ on which a seat $c$ closes. These are carried by the valve disk C which is provided with an extension $C^2$. A screw-threaded socket $c^6$ is arranged in this extension. The upper end of the extension has the shoulder $c^4$ in which are notches $c^5$. These notches engage the ribs $a^3$ in the upper end of the valve chamber and this prevents the turning of the valve disk. The stem E is provided with a screw thread. This screw thread is arranged to act in conjunction with the screw thread in the extension $C^2$ and upon turning the stem open and close the valve. The stem is locked against axial movement by a split ring F which is placed in the circumferential groove $e^2$. This split ring is locked in place by the nut G. The gland I is arranged between the nut G and follower H. The stem is provided with a handle J by which the valve may be operated.

The bonnet D is screwed into the valve body or chamber A and against a packing $a^2$ by means of which a tight joint may be readily accomplished without straining the bonnet D. For this reason a bonnet may be made very light thus saving material which in this class of goods is important.

The plate $C'$ rests on an elastic cushion or spring $c'$ and is held in position by the screw $c^2$. This permits relative movement between the plate $C'$ and the surface $c$ so that both seats forming the double seat of the valve may be brought into close contact.

It will be noted that this style of valve can be made very short and this close coupling of the parts permits of a saving of material as well as in the room necessary to permit of the operation of the valve.

What I claim as new is:—

1. In a valve, the combination of the valve chamber having a diaphragm therein through which extends the valve opening; a valve seat around said opening; a valve disk arranged on said seat; a screw threaded extension on said disk; a stem extending to without the chamber and having a screw threaded portion arranged to act in conjunction with the screw thread on the extension, said stem being also provided with a circumferential groove; the split ring F arranged in said groove; the nut G having a cavity for receiving the split ring and locking it in the groove in the stem; and means for locking the nut G with a fixed part of the valve.

2. In a valve, the combination with the valve chamber having a diaphragm therein through which extends the valve opening; a valve seat surrounding said opening; a valve disk arranged to operate upon said seat; a screw threaded extension on said disk; a screw threaded stem arranged to operate with said screw threaded extension; the ribs $a^3$ secured to the valve chamber and coöperating with the stem to prevent the rotation of the disk; the split ring F engaging said stem; the nut G for securing said split ring; the follower H forming a gland in the bonnet D; and said bonnet D.

In testimony whereof I have hereunto set my hand in the presence of two subscribing witnesses.

HENRY LIPPOLD.

Witnesses:
BIRDENA PHILLIPS,
M. C. SULLIVAN.